(12) United States Patent
Kowdley et al.

(10) Patent No.: US 11,902,188 B1
(45) Date of Patent: Feb. 13, 2024

(54) SYSTEMS AND METHODS FOR LOCATION BASED UPLINK (UL) MULTIPLE-INPUT-MULTIPLE-OUTPUT (MIMO) PAIRING

(71) Applicant: Sprint Spectrum LP, Overland Park, KS (US)

(72) Inventors: Shilpa X. Kowdley, Brambleton, VA (US); Hemanth Pawar, Brambleton, VA (US); Chunmei Liu, Great Falls, VA (US); Krishna Sitaram, Chantilly, VA (US)

(73) Assignee: Sprint Spectrum LP, Overland Park, KS (US)

( * ) Notice: Subject to any disclaimer, the term of this patent is extended or adjusted under 35 U.S.C. 154(b) by 1043 days.

(21) Appl. No.: 15/268,886

(22) Filed: Sep. 19, 2016

(51) Int. Cl.
| | |
|---|---|
| H04L 5/00 | (2006.01) |
| H04B 7/0452 | (2017.01) |
| H04B 17/336 | (2015.01) |
| H04W 36/08 | (2009.01) |
| H04W 36/38 | (2009.01) |

(52) U.S. Cl.
CPC ......... *H04L 5/0037* (2013.01); *H04B 7/0452* (2013.01); *H04B 17/336* (2015.01); *H04W 36/08* (2013.01); *H04W 36/38* (2013.01)

(58) Field of Classification Search
None
See application file for complete search history.

(56) References Cited

U.S. PATENT DOCUMENTS

| | | | |
|---|---|---|---|
| 8,520,616 B2 | 8/2013 | Cui et al. | |
| 8,526,519 B2 | 9/2013 | Chen et al. | |
| 8,599,777 B2 | 12/2013 | Vitthaladevuni et al. | |
| 8,644,422 B2 | 2/2014 | Gao et al. | |
| 8,897,203 B2 | 11/2014 | Song et al. | |
| 2011/0044272 A1* | 2/2011 | Cui ....... | H04B 7/0452 370/329 |
| 2013/0078991 A1* | 3/2013 | Nam ....... | H04W 76/14 455/423 |
| 2013/0079021 A1* | 3/2013 | Centonza ....... | H04W 36/38 455/444 |
| 2014/0105048 A1 | 4/2014 | Tellado et al. | |
| 2014/0161054 A1* | 6/2014 | Sandberg ....... | H04B 7/0452 370/329 |
| 2015/0365833 A1* | 12/2015 | Stafford ....... | H04W 24/02 370/252 |
| 2016/0278095 A1* | 9/2016 | Fodor ....... | H04W 76/14 |
| 2016/0323893 A1* | 11/2016 | Feng ....... | H04L 5/0032 |
| 2016/0345165 A1* | 11/2016 | Hoefel ....... | H04W 8/24 |
| 2017/0223766 A1* | 8/2017 | Lin ....... | H04W 36/08 |

* cited by examiner

*Primary Examiner* — Jeffrey M Rutkowski
*Assistant Examiner* — Mehedi S Aley
(74) *Attorney, Agent, or Firm* — Jones Robb, PLLC (57) ABSTRACT

Systems and methods are described for selecting User Equipment(s) (UEs) for pairing in a cellular network. A channel orthogonality of one or more UEs located within a radio range of a first Access Node (AN) may be determined. The one or more UEs may be prioritized for Uplink (UL) Multi-User Multiple-Input-Multiple-Output (MU-MIMO) pairing when a channel orthogonality meets a set channel orthogonality condition. A second AN located within the radio range of the first AN may be detected. At least one of the prioritized UEs located within a radio range of the second AN may be selected for de-prioritization. The prioritized UEs may be paired to share a same set of resource blocks.

20 Claims, 6 Drawing Sheets

SYSTEMS AND METHODS FOR LOCATION BASED UPLINK (UL) MULTIPLE-INPUT-MULTIPLE-OUTPUT (MIMO) PAIRING

TECHNICAL BACKGROUND

As cellular networks develop, the want for high Quality of Service (QoS) coupled with a shortage of wireless spectrum makes it challenging for network operators to meet multiple users' bandwidth and/or throughput demands simultaneously. Heterogeneous Networks (HetNet) implement Multiple-Input-Multiple-Output (MIMO) schemes/technologies to exploit multipath propagation behaviors, for example, by enabling multiple transmit (Tx) and/or receive (Rx) antennas at Access Nodes (ANs) and/or User Equipment(s) (UEs) to transfer data at a same time (e.g., spatial multiplexing), which effectively increases signal-capturing power to improve link quality and reliability.

Under typical MIMO scheme(s), UEs are prioritized for pairing (i.e., "combined" or "co-scheduled" on a same Resource Block (RB) for Uplink (UL) transmission) based on channel orthogonality and/or a Signal-to-Interference-Plus-Noise (SINR) ratio, ignoring UE location and/or underlying coverage availability, which reduces overall network efficiencies and cell-throughput.

OVERVIEW

Systems and methods are described for selecting UEs for UL MU-MIMO pairing. For example, one or more UEs operating in a radio range of a first AN may be determined. Those UEs whose channel orthogonality meets a condition threshold may be prioritized for UL MU-MIMO pairing. The first AN may detect the presence of a second AN operating within the radio range of the first AN. At least one of the prioritized UEs operating in a radio range of the detected second AN may be selected for de-prioritization. The prioritized UEs may be scheduled for UL MU-MIMO pairing.

DETAILED DESCRIPTION

As cellular networks develop, the want for high Quality of Service (QoS) coupled with a shortage of wireless spectrum makes it challenging for network operators to meet multiple users' bandwidth and/or throughput demands simultaneously. Heterogeneous Networks (HetNet) use Single-User and/or Multi-User Multiple-Input-Multiple-Output (SU/MU-MIMO) enabled transmit (Tx) and/or receive (Rx) antennas deployed at Access Nodes (ANs) and/or User Equipment(s) (UEs) dispersed throughout the cellular network to exploit multipath propagation behaviors. For example, referring to FIG. 1A, multiple SU/MU-MIMO enabled Tx/Rx antennas 124, 126 may be deployed at AN 110 and/or UEs 102, 106 of cellular network 120 such that multiple, parallel Radio Frequency (RF) signals (or data streams) sent to/from UEs 102, 106 at different times and/or from different paths may be "combined" on a same Resource Block (RB) for Uplink (UL) transmission (e.g., using spatial multiplexing), which effectively increases signal-capturing power (i.e., more bits per second per frequency range or Hertz (Hz) of bandwidth) at AN 110 and/or UEs 102, 106 to improve link quality and/or reliability (i.e., reduce fading).

Figure 1A:
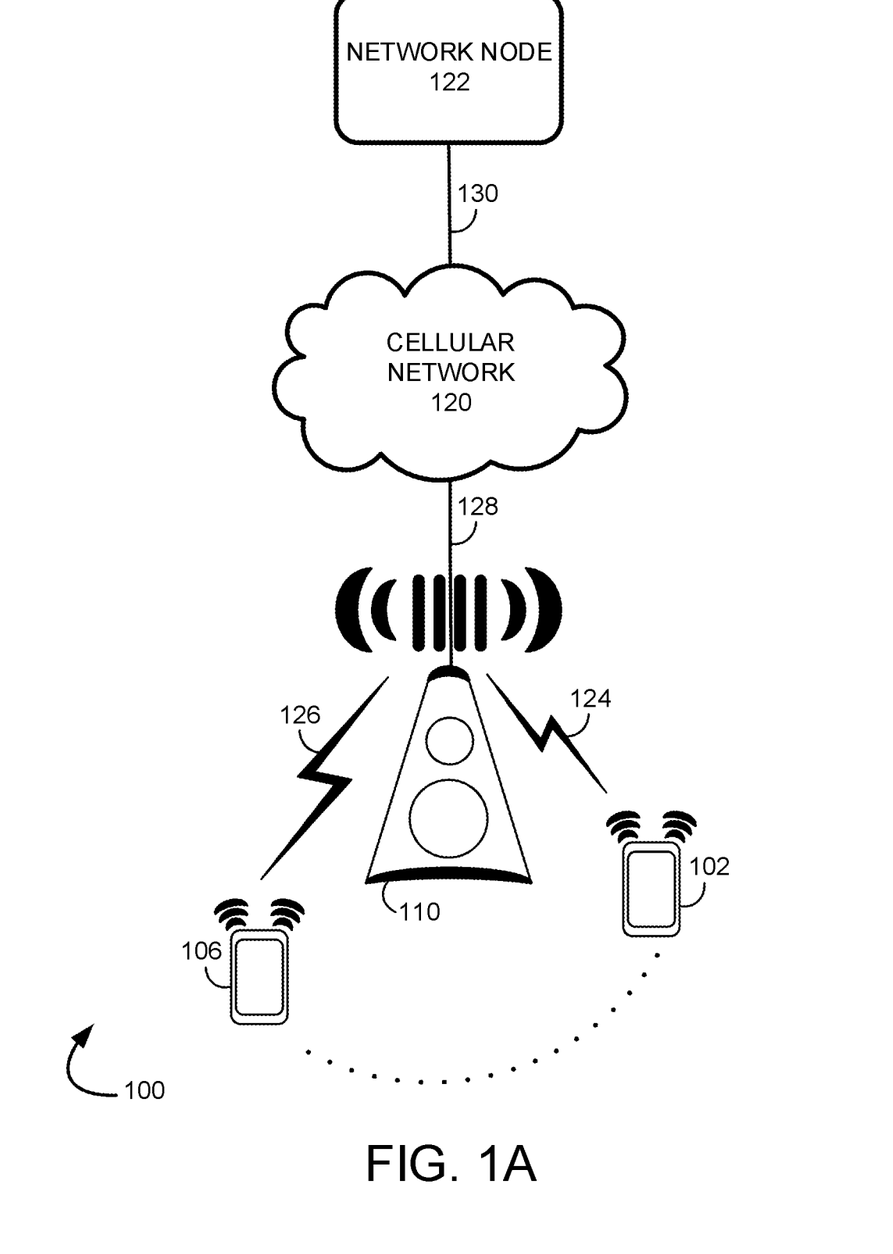
FIG. 1A illustrates an exemplary communication system for de-prioritizing UEs for Single-User and/or Multi-User Multiple-Input-Multiple-Output (SU/MU-MIMO) pairing in a cellular network.
Figure 1B:
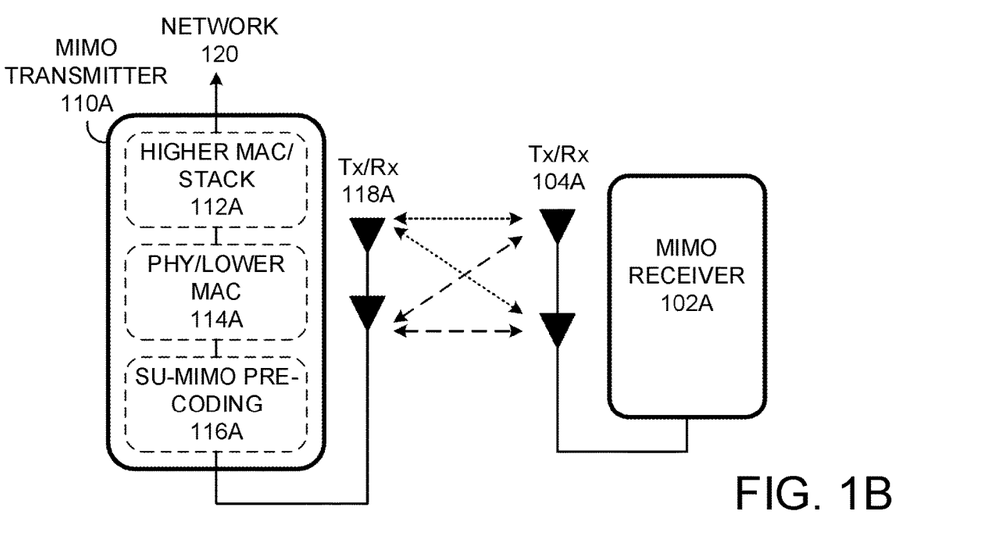
FIG. 1B illustrates an AN of the exemplary communication system illustrated in FIG. 1A operating in SU-MIMO mode.

Referring to FIG. 1B, multiple SU-MIMO enabled Tx/Rx antennas 104A, 118A are deployed at AN 110A to exploit multipath propagation behaviors (e.g., spatial domain) and/or to support spatial multiplexing, beamforming, and/or transmit diversity. For example, multiple SU-MIMO enabled Tx/Rx antennas 104A, 118A may be deployed at AN 110A and/or a single UE 102A of cellular network 120 such that multiple, parallel RF signals (or data streams) are sent to/from UE 102A at a same time to increase data throughput (i.e., point-to-point). On the Downlink (DL), the RF signals may be spatially pre-coded (i.e., amplitude/phase scaling may be applied to the RF signals) and sent to the single UE 102A from AN 110A via multiple SU-MIMO enabled Tx/Rx antennas 104A, 118A. UE 102A uses the multiple, spatially pre-coded RF signals, which arrive at UE 102A from AN 110A with different spatial signatures, to recover RF signals destined for the UE 102A. On the UL, UE 102A can send multiple, spatially pre-coded RF signals to AN 110A; the multiple, spatially pre-coded RF signals are used to identify a source, for example, UE 102A, for each spatially pre-coded RF signal.

AN 110A may include, for example: a higher Media Access Control (MAC) stack module 112A configured to schedule UE 102A for an SU-MIMO operation based on Channel State Information (CSI) sent to AN 110A from UE 102A via SU-MIMO enabled Tx/Rx antennas 104A, 118A; a lower MAC stack module 114A configured to perform data handling functions (e.g., multiplexing, de-multiplexing, modulation, and/or de-modulation) of the RF signals sent to AN 110A from UE 102A via SU-MIMO enabled Tx/Rx antennas 104A, 118A; and, pre-coding stack module 116A configured to transmit the multiple, parallel RF signals from AN 110A to UE 102A based on a pre-coding weight (e.g., determined using Pre-Coding Matrix Information (PMI)) via SU-MIMO enabled Tx/Rx antennas 104A, 118A.

Figure 1C:
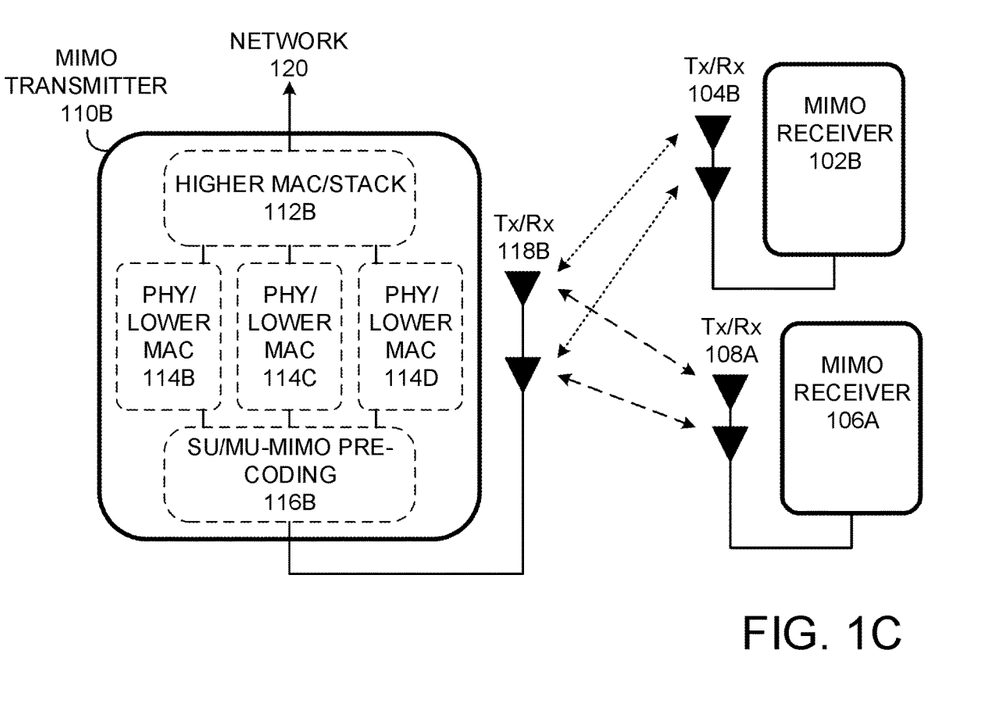
FIG. 1C illustrates an AN of the exemplary communication system illustrated in FIG. 1A operating in SU/MU-MIMO mode.

Referring to FIG. 1C, multiple SU/MU-MIMO enabled Tx/Rx antennas 104B, 108A, 118B are deployed at AN 110B to exploit multipath propagation behaviors (e.g., spatial domain) and/or to support spatial multiplexing, beamforming, and/or transmit diversity. For example, multiple SU/MU-MIMO enabled Tx/Rx antennas 104B, 108A, 118B may be deployed at AN 110B and/or multiple, spatially-separated UEs 102B, 106A of cellular network 120 such that multiple, parallel RF signals (or data streams) are sent to/from UEs 102B, 106A at a same time. On the DL, the RF signals may be spatially pre-coded (i.e., amplitude/phase scaling may be applied to the RF signals) and sent to UEs 102B, 106A from AN 110B concurrently via multiple SU/MU-MIMO enabled Tx/Rx antennas 104B, 108A, 118B. UEs 102B, 106A use the multiple, spatially pre-coded RF signals, which arrive at UEs 102B, 106A from AN 110B with different spatial signatures, to recover RF signals destined for that UE 102B, 106A. On the UL, UEs 102B, 106A can send multiple, spatially pre-coded RF signals at different times and/or from different paths to AN 110B. AN 110B may "combine" the multiple, spatially pre-coded RF signals sent from UEs 102B, 106A on a same RB for UL transmission (e.g., using spatial multiplexing), which effectively increases signal-capturing power at AN 110B. AN 110B uses the multiple, spatially pre-coded RF signals to identify the source, for example, UEs 102B, 106A, of each spatially pre-coded RF signal.

AN 110B may upgrade and/or switch between SU-MIMO and MU-MIMO modes by, for example: configuring higher MAC stack module 112B to coordinate scheduling of multiple, spatially-separated UEs 102B, 106A for an MU-MIMO operation based on CSI sent to AN 110B from UEs 102B, 106A via SU/MU-MIMO enabled Tx/Rx antennas 104B, 108A, 118B; multiplying the data handling functions of lower MAC stack module 114A (illustrated in FIG. 1B) at lower MAC stack modules 114B, 114C, 114D to accommodate the multiple, parallel RF signals sent to AN 110B from the multiple, spatially-separated UEs 102B, 106A via SU/MU-MIMO enabled Tx/Rx antennas 104B, 108A, 118B concurrently; and, modifying pre-coding stack module 116A (including PMI) (illustrated in FIG. 1B) at pre-coding stack module 116B to transmit multiple, parallel RF signals from AN 110B to multiple, spatially-separated UEs 102B, 106A via SU/MU-MIMO enabled Tx/Rx antennas 118B deployed at AN 110B concurrently.

Referring again to FIG. 1A, AN 110 may upgrade and/or switch between SU-MIMO and MU-MIMO modes (illustrated in FIG. 1C). Under a typical SU/MU-MIMO mode, AN 110 may prioritize UEs 102, 106 for pairing (i.e., "combine" or "co-schedule" UEs 102, 106 on a same RB for UL transmission) based on channel orthogonality and/or SINR ratios above a set threshold (i.e., "primary criteria") to increase signal-capturing power (e.g., throughput or sum rate). Channel orthogonality may be achieved by assigning cyclic shifts, allocated to Demodulation Reference Signals (DM-RS), to differentiate multiple, parallel RF signals (or data streams) sent to/received at AN 110 from UEs 102, 106 via SU/MU-MIMO enabled Tx/Rx antennas 124, 126.

In one embodiment, AN 110 collects CSI sent to AN 110 from UEs 102, 106 via SU/MU-MIMO enabled Tx/Rx antennas 124, 126. The collected CSI may include one or more of: Channel Quality Indication (CQI), PMI, ACK/NACK information, and/or Rank Information (RI). AN 110 uses the collected CSI to prioritize UEs 102, 106 for pairing. For example, CSI may be quantized at UEs 102, 106 based on a codebook selected to maximize signal-capturing power (e.g., throughput or sum-rate) based on a pre-coding weight (e.g., determined using PMI) applied to the multiple, parallel RF signals (or data streams) sent to AN 110 from UEs 102, 106 via SU/MU-MIMO enabled Tx/Rx antennas 124, 126. A code word may be selected to represent an UL channel and an index of the code word (e.g., the PMI) may be fed back to AN 110 from UEs 102, 106; the number of bits, B, used for PMI feedback is related to the codebook size. AN 110 uses the CSI and/or PMI from UEs 102, 106 to pre-code the RF signals; PMI may also be used by UEs 102, 106 to determine CQI, which roughly corresponds to SINR. On receipt of the CQI (and SINR), sent from UEs 102, 106, AN 110 applies channel coding rates and/or modulation to the RF signals and selects an associated Modulation and Coding Scheme (MCS) for the UL channel condition. Combined with MCS, CQI (and SINR) can be converted into an expected signal-capturing power (e.g., throughput or sum-rate). The expected signal-capturing power considers, for example, a number of SU/MU-MIMO enabled Rx antennas 124, 126 deployed at AN 110 (i.e., 4Rx, 8Rx, etc., may have higher gains than 2Rx). AN 110 uses the expected signal-capturing power to adjust an operating mode (i.e., SU/MU-MIMO) of AN 110 and/or UEs 102, 106 and/or to allocate RBs to UEs 102, 106.

Additional secondary criteria (i.e., criteria additional to channel orthogonality and/or SINR ratios above a threshold) may be used by AN 110 to pair UEs 102, 106 on a same RB for UL transmission. For example, the additional secondary criteria may include: (i) scheduling UEs 102, 106 on different RBs (regardless of the primary criteria) when there are sufficient RBs in a current Transmission Time Interval (TTI) to schedule the UEs separately; (ii) calculating an expected signal-capturing power gain (e.g., throughput or sum rate) at AN 110 after pairing UEs 102, 106 and, if no gain is found, scheduling UEs 102, 106 separately; (iii) excluding Hybrid-Automatic-Repeat-Request (HARQ) re-transmission UEs 102, 106 from pairing; (iv) requiring a higher priority to pair Non-Giga Bit Rate (Non-GBR) UEs 102, 106; (v) excluding TTI bundling UEs 192, 106 from pairing; (vi) selecting high-speed, low-priority UEs 102, 106 for pairing; and, (vii) excluding cell-edge, TTI bundling UEs 102, 106 from pairing.

Because UL MU-MIMO UE pairing at AN 110 does not consider underlying coverage (e.g., from a short-range AN and/or neighboring AN) of the paired UEs, overall network efficiencies and cell-throughput may suffer. In one embodiment, AN 110 may select UEs 102, 106 with a channel orthogonality above a set threshold as candidates for UL MU-MIMO pairing. Where there are multiple, potential UE 102, 106 pairings, AN 110 may check a location of the candidate UEs 102, 106 for underlying coverage. When underlying coverage is detected for a candidate UE 102, 106, AN 110 de-prioritizes that UE for UL MU-MIMO pairing. AN 110 co-schedules the prioritized UEs 102, 106 (i.e., those without underlying coverage) to share a same RB.

FIG. 1A illustrates an exemplary communication system 100 for de-prioritizing UEs for SU/MU-MIMO pairing. FIG. 1B illustrates an AN of the exemplary communication system 100 illustrated in FIG. 1A operating in SU-MIMO mode. FIG. 1C illustrates an AN of the exemplary communication system 100 illustrated in FIG. 1A operating in SU/MU-MIMO mode. System 100 can comprise UEs 102, 102A, 102B, 106, 106A, ANs 110, 110A, 110B, cellular network 120, and network node 122. UEs 102, 102A, 102B, 106, 106A may be connected to ANs 110, 110A, 110B by communication links 124, 126 (illustrated in FIG. 1A). ANs 110, 110A, 110B may be connected to cellular network 120 by communication link 128 (illustrated in FIG. 1A). Cellular network 120 may be connected to network node 122 by communication link 130. Communication links 124, 126, 130 can be wired or wireless and use various communication protocols such as Internet, Internet Protocol (IP), Local-Area Network (LAN), optical networking, Hybrid Fiber Coax (HFC), telephony, T1, or some other communication format—including combinations, improvements or variations thereof. Wireless communication links can be a radio frequency, microwave, infrared, or other similar signal, and can use a suitable communication protocol, for example, Global System for Mobile Communications (GSM), Code Division Multiple Access (CDMA), Worldwide Interoperability for Microwave Access (WiMAX), or Long Term Evolution (LTE), or combinations thereof. Other wireless protocols can also be used. Links 124, 126, 130 can be a direct link or might include various equipment, intermediate components, systems, and networks.

Other network elements may be present in the system 100 to facilitate communication but are omitted for clarity, such as controller nodes, base stations, base station controllers, gateways, Mobile Switching Centers (MSC), Dispatch Application Processors (DAPs), and location registers such as a Home Location Register (HLR) or Visitor Location Register (VLR). Furthermore, other network elements maybe present to facilitate communication, such as between ANs 110, 110A, 110B and cellular network 120, which are omitted for clarity, including additional processing nodes, routers, gateways, and physical and/or wireless data links for carrying data among the various network elements.

UEs 102, 102A, 102B, 106, 106A can be any device configured to communicate over system 100 using a wireless interface. For example, UEs 102, 102A, 102B, 106, 106A can include a remote terminal unit, a cell phone, a smart phone, a computing platform such as a laptop, palmtop, or a tablet, a Personal Digital Assistant (PDA), or an internet access device, and combinations thereof. It is noted that while one or two UEs 102, 102A, 102B, 106, 106A are illustrated in FIGS. 1A-1C as being in communication with ANs 110, 110A, and/or 110B, any number of UEs can be implemented according to various exemplary embodiments disclosed herein.

UEs 102, 102A, 102B, 106, 106A can transmit and/or receive information over system 100 using various communication services. These services can include various voice, data, and/or MBMS services and applications. For example, mobile voice services, mobile data services, Push-to-Talk (PTT) services, internet services, web browsing, email, pictures, picture messaging, video, video messaging, broadcast video, audio, voicemail, music, MP3's, ring tones, stock tickers, news alerts, etc.

ANs 110, 110A, 110B can be any network node configured to provide communication between UEs 102, 102A, 102B, 106, 106A and cellular network 120. ANs 110, 110A, 110B can be standard ANs and/or short range, low-power ANs. A standard AN can be a macrocell AN such as a base transceiver station, a radio base station, an eNodeB device, or an enhanced eNodeB device, or the like. In an exemplary embodiment, a macrocell AN can have a coverage area in the range of approximately five kilometers to thirty-five kilometers and an output power in the tens of watts. A short range AN can include a microcell AN, a picocell AN, a femtocell AN, or the like such as a home NodeB or a home eNodeB device. In an exemplary embodiment, a picocell AN can have a coverage area of approximately a half a kilometer and an output power of less than one watt. In yet another exemplary embodiment, a femtocell AN can have a coverage area in the range of fifty to two-hundred meters and an output power in the range of 0.5 to 2 watts. Femtocell AN can be cellular ANs or WiFi ANs. In addition, a UE configured to enter a hotspot mode can be a femtocell AN. It is noted that while one ANs 110, 110A, 110B is illustrated in each of FIGS. 1A-1C, any number of ANs can be implemented within system 100.

ANs 110, 110A, 110B can comprise a processor and associated circuitry to execute or direct the execution of computer-readable instructions to obtain information. ANs 110, 110A, 110B can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 110, 110A, 110B can receive instructions and other input at a user interface.

Network node 122 can be any network node configured to communicate information and/or control information over system 100. For example, network node 122 can receive information from or transmit information to UEs 102, 102A, 102B, 106, 106A over system 100. For ease of illustration, network node 122 is shown to be located within the backhaul of the system 100. However, network node 122 could alternatively be between ANs 110, 110A, 110B and cellular network 120. Network node 122 can be a standalone computing device, computing system, or network component, and can be accessible, for example, by a wired or wireless connection, or through an indirect connection such as through a computer network or cellular network. For example, network node 122 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 122 is not limited to any specific technology architecture, such as LTE and can be used with any network architecture and/or protocol.

Network node 122 can comprise a processor and associated circuitry to execute or direct the execution of computer-readable instructions to obtain information. Network node 122 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network node 122 can receive instructions and other input at a user interface.

Cellular network 120 can be a wired and/or wireless communication network, and can comprise processing nodes, routers, gateways, and physical and/or wireless data links for carrying data among various network elements, including combinations thereof, and can include a LAN or Wide-Area Network (WAN), and an internetwork (including the internet). Cellular network 120 can be capable of carrying data, for example, to support voice, PTT, broadcast video, and data communications by a UE such as UEs 102, 102A, 102B, 106, 106A. Wireless network protocols can comprise MBMS, CDMA 1xRTT, GSM, Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and WiMAX. Wired network protocols that may be utilized by cellular network 120 comprise Ethernet, Fast Ethernet, Gigabit Ethernet, Local Talk (such as Carrier Sense Multiple Access with collision Avoidance), Token Ring, Fiber Distributed Data Interface (FDDI), and Asynchronous Transfer Mode (ATM). Cellular network 120 can also comprise additional base stations, controller nodes, telephony switches, internet routers, network gateways, computer systems, communication links, or some other type of communication equipment, and combinations thereof.

Figure 2:
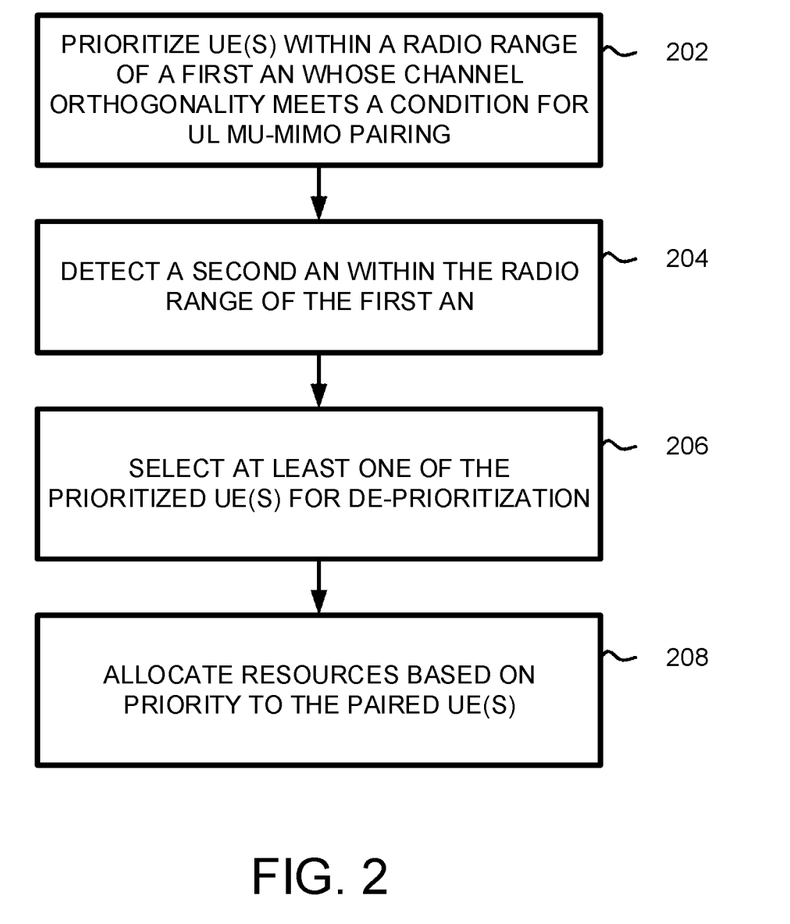
FIG. 2 illustrates a flow chart of an exemplary method for de-prioritizing UEs for UL MU-MIMO pairing in a cellular network.

FIG. 2 illustrates a flow chart of an exemplary method for de-prioritizing UEs for UL MU-MIMO pairing in a cellular network. The method will be discussed with reference to the exemplary system 100 illustrated in FIGS 1A-1C. However, the method for de-prioritizing UEs for UL MU-MIMO pairing illustrated in FIG. 2 can be implemented with any suitable communication system. In addition, although FIG. 2 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 2, multiple SU/MU-MIMO enabled Tx/Rx antennas 124, 126 may be deployed at AN 110 and/or UEs 102, 106 (illustrated in FIG. 1A) of cellular network 120 such that multiple, parallel RF signals (or data streams) sent at different times and/or from different paths may be "combined" on a same RB for UL MU-MIMO transmission (e.g., using spatial multiplexing).

For example, at 202, cellular network 120 detects a channel orthogonality (e.g., non-overlapping, non-interfering channels) above a set threshold of UEs 102, 106 located within a radio range of AN 110. Channel orthogonality may be achieved by, for example, assigning cyclic shifts, allocated to DM-RS, to differentiate the multiple, parallel RF signals sent to/received at AN 110 from UEs 102, 106 via SU/MU-MIMO enabled Tx/Rx antennas 124, 126. AN 110 selects UEs 102, 106 from a pool of potential UEs and prioritizes those UEs 102, 106 with a channel orthogonality that meets an orthogonality condition as candidates for UL MU-MIMO pairing.

At 204 and 206, AN 110 determines that there are multiple UE candidates 102, 106 for UL MU-MIMO pairing. AN 110 checks a location of the multiple UE candidates 102, 106 for underlying coverage (e.g., from a short-range AN and/or neighboring AN) using, for example, an algorithm stored in the cellular network 120. When underlying coverage is detected for a candidate UE 102, 106, AN 110 de-prioritizes that UE 102, 106 for UL MU-MIMO pairing.

At 208, AN 110 may dynamically selects prioritized UEs 102, 104 from the candidate UEs (i.e., pool of candidate UEs selected at step 202) to be paired (i.e., "combined" or "co-scheduled") on a same RB for UL MU-MIMO transmission. For example, AN 110 co-schedules the prioritized UEs 102, 106 (i.e., those without underlying coverage) to share a same RB. The priority of UEs 102, 106 whose channel orthogonality meets an orthogonality condition with underlying coverage (e.g., from a short-range AN and/or neighboring AN) are de-prioritized for UL MU-MIMO pairing. AN 110 may allocate RB s to UEs 102, 106 prioritized for UL MU-MIMO pairing at a scheduler (e.g., higher MAC stack module 112B illustrated in FIG. 1C) over de-prioritized UEs 102, 106 and distribute the allocated RBs to UEs 102, 106 via a scheduling algorithm (e.g., proportional fairness, round robin, etc.).

Figure 3:
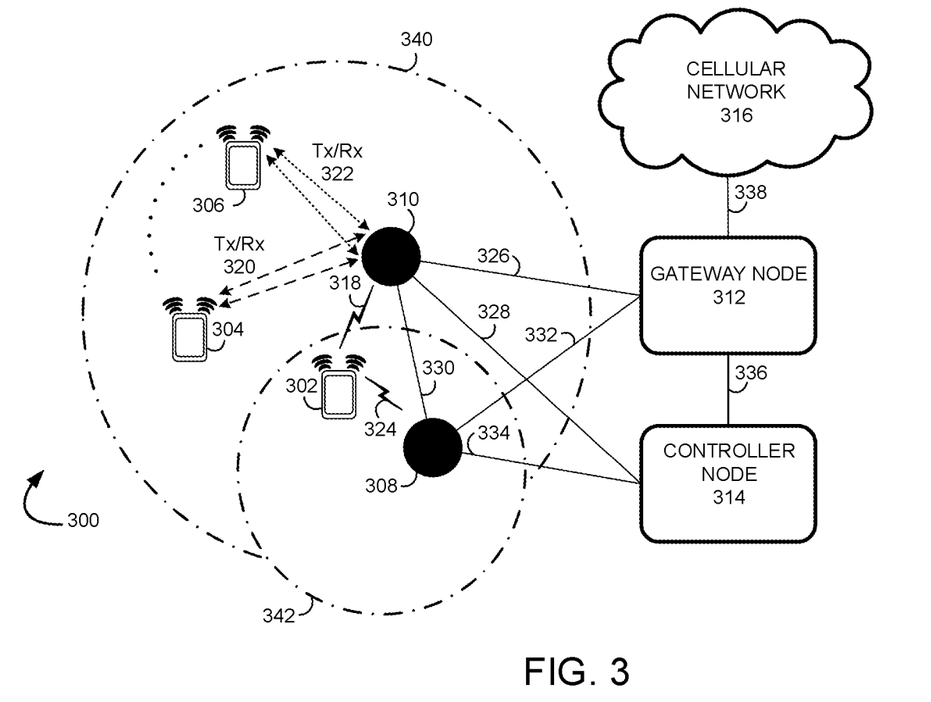
FIG. 3 illustrates another exemplary communication system for de-prioritizing UEs for UL MU-MIMO pairing in a cellular network.

FIG. 3 illustrates another exemplary communication system 300 for de-prioritizing UEs for UL MU-MIMO pairing. System 300 can comprise UEs 302, 304, 306, ANs 308, 310, gateway node 312, controller node 314, and cellular network 316. Other network elements may be present in the communication system 300 to facilitate communication but are omitted for clarity, such as base stations, base station controllers, gateways, MSC, DPAs, and location registers such as a HLR or VLR. Furthermore, other network elements may be present to facilitate communication, such as between ANs 308, 310 and cellular network 316, which are omitted for clarity, including additional processing nodes, routers, gateways, and physical and/or wireless data links for carrying data among the various network elements.

UEs 302, 304, 306 can be any device configured to communicate over system 300 using a wireless interface. For example, UEs 302, 304, 306 can include a remote terminal unit, a cell phone, a smart phone, a computing platform such as a laptop, palmtop, or a tablet, a PDA, or an internet access device, and combinations thereof. UEs 302, 304, 306 can include one or more transceivers (e.g., SU/MU-MIMO enabled Tx/Rx antennas 318, 320, 322, 324) for transmitting and receiving data over system 300. Each transceiver can be associated with the same or different frequency bands, the same or different radio access technologies, the same or different network providers, and/or the same or different services. For example, UEs 302, 304, 306 can include Tx/Rx antennas 318, 320, 322, 324 that are associated with one or more of the following: CDMA, GSM, WiMAX, LTE, HSDPA, IEEE 802.11, WiFi, Bluetooth, Zigbee, IrDA, MBMS, etc.

UEs 302, 304, 306 can be connected with ANs 308, 310 through communication links 318, 320, 322, 324. Links 318, 320, 322, 324 can use various communication media, such as air, space, metal, optical fiber, or some other signal propagation path—including combinations thereof. Links 318, 320, 322, 324 may comprise many different signals sharing the same link. Links 318, 320, 322, 324 could include multiple signals operating in a single "airpath" comprising beacon signals, user communications, communication sessions, overhead communications, frequencies, timeslots, transportation ports, logical transportation links, network sockets, packets, or communication directions. For example, user communication between UEs 302, 304, 308 and ANs 308, 310 could share the same representative wireless link, but be transferred over different communication sessions, frequencies, timeslots, packets, ports, sockets, logical transport links, or in different directions—including combinations thereof.

UEs 302, 304, 306 can transmit and/or receive information over system 300 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

ANs 308, 310 can be any network node configured to provide communication between UEs 302, 304, 306 and cellular network 316. ANs 308, 310 can be standard ANs or a short range, low-power ANs. A standard AN can be a macrocell AN such as a base transceiver station, a radio base station, an eNodeB device, or an enhanced eNodeB device, or the like. In an exemplary embodiment, a macrocell AN can have a coverage area in the range of approximately five kilometers to thirty-five kilometers and an output power in the tens of watts. A short range AN can include a microcell AN, a picocell AN, a femtocell AN, or the like such as a home NodeB or a home eNodeB device. In an exemplary embodiment, a picocell AN can have a coverage area of approximately a half a kilometer and an output power of less than one watt. In yet another exemplary embodiment, a femtocell AN can have a coverage area in the range of fifty to two-hundred meters and an output power in the range of 0.5 to 1 watts. Femtocell AN can be cellular AN or WiFi AN. In addition, a UE configured to enter a hotspot mode can be a femtocell AN. It is noted that while one AN 308 is illustrated in FIG. 3, any number of ANs can be implemented within system 300.

ANs 308, 310 can comprise a processor and associated circuitry to execute or direct the execution of computer-readable instructions to obtain information. ANs 308, 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 308, 310 can receive instructions and other input at a user interface.

Gateway node 312 can be any network node configured to interface with other network nodes using various protocols. Gateway node 312 can communicate user data over system 300. Gateway node 312 can be a standalone computing device, computing system, or network component, and can be accessible, for example, by a wired or wireless connection, or through an indirect connection such as through a computer network or cellular network. For example, gateway node 312 can include a Serving Gateway (SGW) and/or a Public Data Network Gateway (PGW), etc. One of ordinary skill in the art would recognize that gateway node 312 is not limited to any specific technology architecture, such as LTE and can be used with any network architecture and/or protocol.

Gateway node 312 can comprise a processor and associated circuitry to execute or direct the execution of computer-readable instructions to obtain information. Gateway node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 312 can receive instructions and other input at a user interface.

Controller node 314 can be any network node configured to communicate information and/or control information over system 300. Controller node 314 can be configured to transmit control information associated with a handover procedure. Controller node 314 can be a standalone computing device, computing system, or network component, and can be accessible, for example, by a wired or wireless connection, or through an indirect connection such as through a computer network or cellular network. For example, controller node 314 can include a MME, a HSS, a PCRF, an AAA node, a RMS, a SPS, a policy server, etc. One of ordinary skill in the art would recognize that controller node 314 is not limited to any specific technology architecture, such as LTE and can be used with any network architecture and/or protocol.

Controller node 314 can comprise a processor and associated circuitry to execute or direct the execution of computer-readable instructions to obtain information. Controller node 314 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 314 can receive instructions and other input at a user interface.

AN 308 may be connected with gateway node 312 through communication link 332 and with controller node 314 through communication link 334. AN 308 may be connected with AN 310 through communication link 330. AN 310 may be connected with gateway node 312 through communication link 326 and with controller node 314 through communication link 328. Gateway node 312 may be connected with controller node 314 through communication link 336 and with cellular network 316 through communication link 338. Links 326, 328, 330, 332, 334, 336, 338 can be wired or wireless and use various communication protocols such as Internet, IP, LAN, optical networking, HFC, telephony, T1, or some other communication format—including combinations, improvements, or variations thereof. Links 326, 328, 330, 332, 334, 336, 338 can be a RF, microwave, infrared, or other similar signal, and can use a suitable communication protocol, for example, GSM, CDMA, WiMAX, or LTE, or combinations thereof. Other wireless protocols can also be used. Links 326, 328, 330, 332, 334, 336, 338 can be a direct link or might include various equipment, intermediate components, systems, and networks.

Cellular network 316 can be a wired and/or wireless communication network, and can comprise processing nodes, routers, gateways, and physical and/or wireless data links for carrying data among various network elements, including combinations thereof, and can include a LAN or WAN, and an internetwork (including the internet). Cellular network 316 can be capable of carrying data, for example, to support voice, PTT, broadcast video, and data communications by a UE such as UEs 302, 304, 306. Wireless network protocols can comprise MBMS, CDMA 1xRTT, GSM, UMTS, HSPA, EV-DO, EV-DO rev. A, 3GPP LTE, and WiMAX. Wired network protocols that may be utilized by cellular network 316 comprise Ethernet, Fast Ethernet, Gigabit Ethernet, Local Talk (such as Carrier Sense Multiple Access with Collision Avoidance), Token Ring, FDDI, ATM. Cellular network 316 can also comprise additional base stations, controller nodes, telephony switches, internet routers, network gateways, computer systems, communication links, or some other type of communication equipment, and combinations thereof.

Referring to FIG. 3, multiple SU/MU-MIMO enabled Tx/Rx antennas 318, 320, 322, 324 may be deployed at ANs 308, 310 and/or UEs 302, 304, 306 of cellular network 316 such that multiple, parallel RF signals (or data streams) sent to/from UEs 302, 304, 306 at different times and/or from different paths may be "combined" on a same RB for UL MU-MIMO transmission (e.g., using spatial multiplexing), which effectively increases signal capturing power (i.e., more bits per second per frequency range or Hz of bandwidth) at ANs 308, 310 and/or UEs 302, 304, 306 to improve link quality and/or reliability (i.e., reduce fading).

For example, ANs 308, 310 may upgrade and/or switch between SU-MIMO and MU-MIMO modes (illustrated in FIG. 1C). In MU-MIMO mode, ANs 308, 310 may select UEs 302, 304, 306 with a channel orthogonality (e.g., non-overlapping, non-interfering channels) above a set threshold as candidates for UL MU-MIMO pairing (i.e., "combine" or "co-schedule" UEs 302, 304, 306 on a same RB for UL transmission). Where there are multiple, potential UE 302, 304, 306 pairings, AN 310 may check a location of the candidate UEs 302, 304, 306 for underlying coverage (e.g., from a short-range AN 308 and/or neighboring AN)

using, for example, an algorithm stored in the cellular network 316. When underlying coverage is detected for a candidate UE, for example, UE 302, AN 310 de-prioritizes that UE 302 for UL MU-MIMO pairing. AN 310 may allocate RBs to UEs 304, 306 prioritized for UL MU-MIMO pairing at a scheduler (e.g., higher MAC stack module 112B illustrated in FIG. 1C) over de-prioritized UEs 102, 106 and distribute the allocated RBs to UEs 304, 306 via a scheduling algorithm (e.g., proportional fairness, round robin, etc.).

Figure 4:
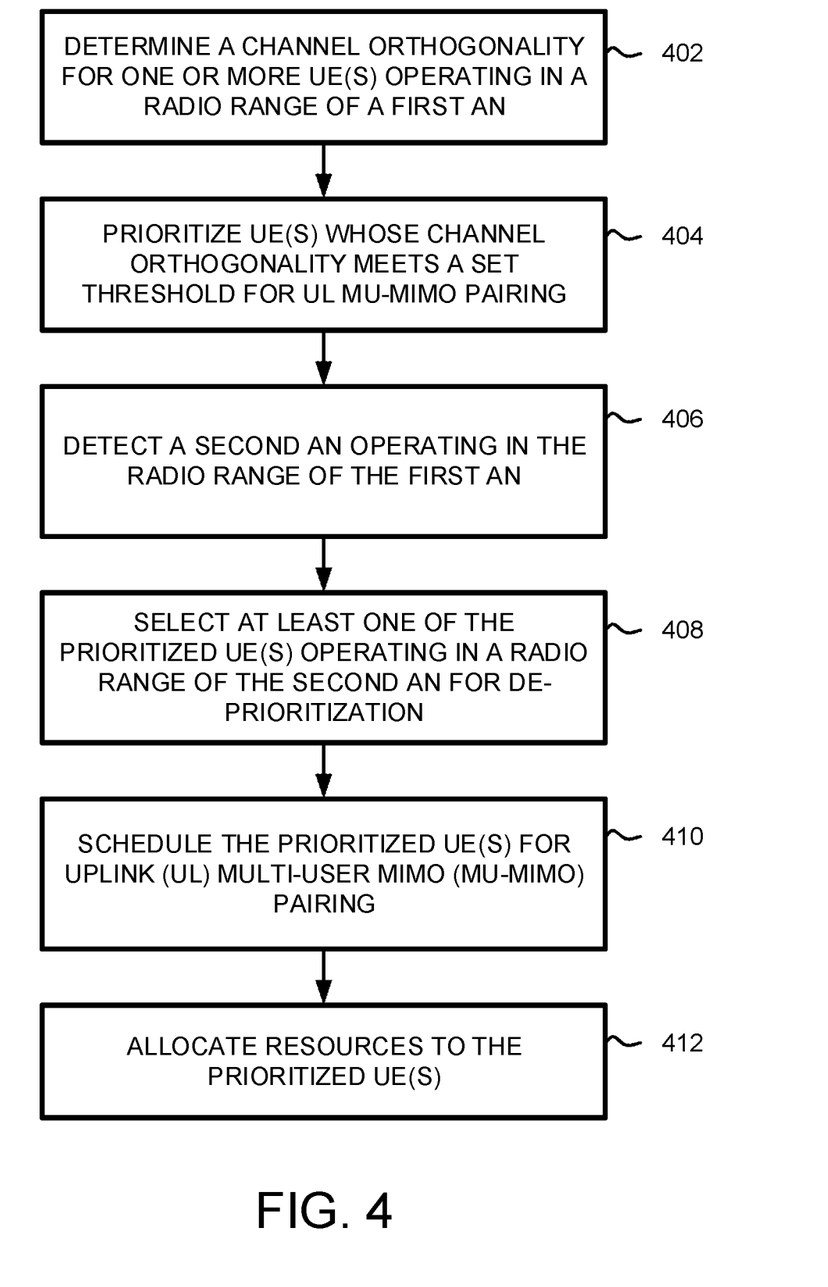
FIG. 4 illustrates another flow chart of an exemplary method for de-prioritizing UEs for UL MU-MIMO pairing in a cellular network.

FIG. 4 illustrates a flow chart of an exemplary method for de-prioritizing UEs for UL MU-MIMO pairing in a cellular network. The method will be discussed with reference to the exemplary system 300 illustrated in FIG. 3. But, the method for de-prioritizing UEs for UL MU-MIMO pairing illustrated in FIG. 4 can be implemented in the exemplary system 100 illustrated in FIGS. 1A and 1C, or with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 4, multiple SU/MU-MIMO enabled Tx/Rx antennas 318, 320, 322, 324 may be deployed at ANs 308, 310 and/or UEs 302, 304, 306 of cellular network 316 such that multiple, parallel RF signals (or data streams) sent to/from UEs 302, 304, 306 at different times and/or from different paths may be "combined" on a same RB for UL transmission (e.g., using spatial multiplexing).

For example, at 402, cellular network 316 via AN 310 detects a channel orthogonality (e.g., non-overlapping, non-interfering channels) of one or more UEs 302, 304, 306 operating in a radio range 340 of AN 310. Channel orthogonality may be achieved by, for example, assigning cyclic shifts, allocated to DM-RS, to differentiate the multiple, parallel RF signals sent to/received at AN 310 from UEs 302, 304, 306 via SU/MU-MIMO enabled Tx/Rx antennas 318, 320, 322.

At 404, AN 310, operating in MU-MIMO mode, selects one or more UEs 302, 304, 306 from a pool of potential UEs (operating in radio range 340) with a channel orthogonality above a set threshold as candidates for UL MU-MIMO pairing (i.e., "combine" or "co-schedule" UEs 302, 304, 306 on a same RB for UL transmission). That is, AN 310 selects UEs 302, 304, 306 operating in a radio range 340 of AN 310 for UL MU-MIMO pairing that satisfy a channel orthogonality condition.

At 406 and 408, AN 310 determines that there are multiple UE candidates 302, 304, 306 for UL MU-MIMO pairing. AN 310 checks a location of the multiple UE candidates 302, 304, 306 for underlying coverage (e.g., from a short-range AN 308 and/or neighboring AN) using, for example, an algorithm stored in the cellular network 316. When AN 310 detects underlying coverage for UE 302, for example, a radio range 342 of AN 308, AN 310 de-prioritizes UE 302 for UL-MU-MIMO pairing. Due to the plug and play nature of short-range ANs, system 300 may maintain a constant check of an on/off state of short-range AN 308 and/or a location of the short-range AN 308 within the radio range 340 of AN 310.

AN 310 may elect to consider other secondary criteria for selecting UEs 302, 304, 306 for pairing. These secondary criteria (i.e., criteria additional to orthogonality and/or underlying coverage) may include: (i) SINR above a set threshold; (ii) scheduling UEs 302, 304, 306 on different RBs (regardless of the primary criteria) when there are sufficient RBs in a current TTI to schedule UEs 302, 304, 306 separately; (iii) calculating an expected signal-capturing power gain (e.g., throughput or sum rate) at AN 308 after pairing UEs 302, 304, 306 and, if no gain is found, scheduling UEs 302, 304, 306 separately; (iv) excluding HARQ re-transmission UEs 302, 304, 306 from pairing; (v) requiring a higher priority to pair Non-GBR UEs 302, 304, 306; (vi) excluding TTI bundling UEs 302, 304, 306 from pairing; (vii) selecting high-speed, low-priority UEs 302, 304, 306 for pairing; and (viii) excluding cell-edge, TTI bundling UEs 302, 304, 306 from pairing. AN 310 may also elect to "handoff" de-prioritized UEs 302 located within a radio range 342 of AN 308. For example, when AN 310 detects underlying coverage for UE 302, for example, a radio range 342 of AN 308, AN 310 may de-prioritize UE 302 for UL-MU-MIMO pairing and perform a "handoff" of UE 302 from AN 310 to AN 308.

At 410 and 412, AN 310 may allocate RBs to UEs 304, 306 prioritized for UL MU-MIMO pairing at a scheduler (e.g., higher MAC stack module 112B illustrated in FIG. 1C) and distribute the allocated RBs to UEs 304, 306 via a scheduling algorithm (e.g., proportional fairness, round robin, etc.). After RBs have been allocated to UEs 304, 306 paired for UL MU-MIMO, AN 310 may allocate and/or distribute remaining RBs to other de-prioritized UEs 302 operating in a radio range 340 of AN 310 via the scheduler.

Figure 5:
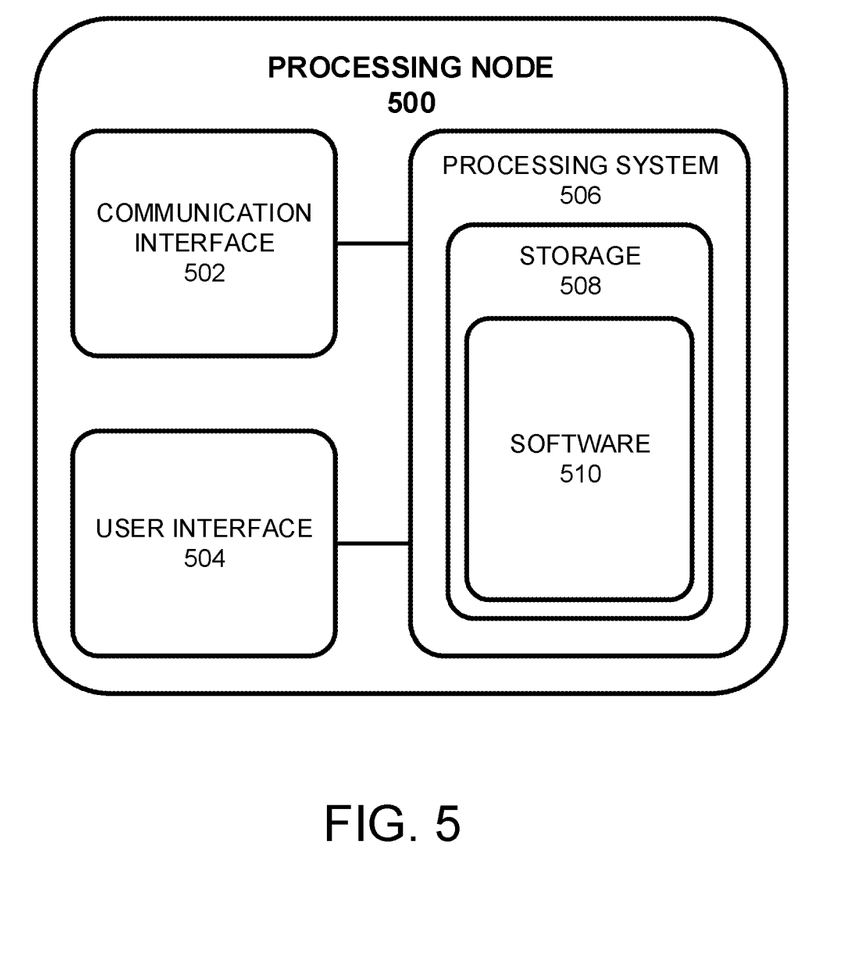
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication AN for a UE. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include ANs 110, 110A, 110B, 308, 310, network node 122, gateway node 312, and controller node 314. Processing node 500 can also be an adjunct or component of a network element, such as an element of ANs 110, 110A, 110B, 308, 310, gateway node 312, and controller node 314. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for selecting wireless devices for pairing in a cellular network, the method comprising:
    prioritizing a plurality of wireless devices located within a radio range of a first access node for uplink (UL) multi-user multiple-input-multiple-output (MU-MIMO) pairing, the prioritized wireless devices having a channel orthogonality meeting a channel orthogonality condition;
    detecting a second access node located within the radio range of the first access node;
    determining a location of each of the prioritized wireless devices with respect to the second access node to detect underlying coverage deployed by the second access node for at least one prioritized wireless device;
    selecting, based on the detection of underlying coverage, the at least one prioritized wireless device located within the underlying coverage deployed by the second access node for de-prioritization for UL MU-MIMO pairing;
    de-prioritizing the selected wireless device for UL MU-MIMO pairing;
    pairing remaining prioritized wireless devices to share a same set of resource blocks; and
    serving the at least one de-prioritized wireless device by one of (a) handing over the at least one de-prioritized wireless device to the second access node; or (b) distributing remaining resource blocks from the first access node to the at least one de-prioritized wireless device.

2. The method of claim 1, wherein the plurality of wireless devices are selected as candidates for UL MU-MIMO pairing from a pool of potential wireless devices.

3. The method of claim 2, wherein the wireless devices selected as candidates for UL MU-MIMO exceed an UL MU-MIMO pairing threshold.

4. The method of claim 1, further comprising:
    performing a handover of the de-prioritized wireless device from the first access node to the second access node.

5. The method of claim 1, further comprising:
    prioritizing the plurality of wireless devices based on a Signal-to-Interference-Plus-Noise (SINR) ratio reported by the plurality of wireless devices.

6. The method of claim 1, further comprising:
    scheduling the prioritized and de-prioritized wireless devices on different RBs when there are sufficient RBs in a current transmission time interval (TTI) to schedule the prioritized and de-prioritized wireless devices separately.

7. The method of claim 1, further comprising:
    calculating an expected signal-capturing power gain at the first access node after pairing the prioritized wireless devices.

8. The method of claim 1, wherein wireless devices located at a cell-edge of the first access node are de-prioritized for UL MU-MIMO pairing.

9. A system for selecting wireless devices for pairing in a cellular network, the system comprising:
    a processing node configured to:
    prioritize a plurality of wireless devices located within a radio range of a first access node for uplink (UL) multi-user multiple-input-multiple-output (MU-MIMO) pairing, the wireless devices having a channel orthogonality meeting a set channel orthogonality condition;
    detect a second access node located within the radio range of the first access node;
    determine a location of each of the prioritized wireless devices with respect to the second access node to detect underlying coverage deployed by the second access node for at least one prioritized wireless device;
    select, based on the detection of underlying coverage, the at least one prioritized wireless device located within underlying coverage deployed by the second access node for de-prioritization for UL MU-MIMO pairing;
    de-prioritize the selected wireless device located within a radio range of the second access node for UL MU-MIMO pairing;
    pair remaining prioritized wireless devices to share a same set of resource blocks; and
    serve the at least one de-prioritized wireless device by one of (a) handing over the at least one de-prioritized wireless device to the second access node; or (b) distributing remaining resource blocks from the first access node to the at least one de-prioritized wireless device.

10. The system of claim 9, the processing node further configured to:
    select the plurality of wireless devices as candidates for UL MU-MIMO pairing from a pool of potential wireless devices.

11. The system of claim 10, wherein the wireless devices selected as candidates for UL MU-MIMO exceed an UL MU-MIMO pairing threshold.

12. The system of claim 9, the processing node further configured to:

perform a handover of the de-prioritized wireless device from the first access node to the second access node.

13. The system of claim 9, the processing node further configured to:
prioritize the plurality of wireless devices based on a Signal-to-Interference-Plus-Noise (SINR) ratio reported by the plurality of wireless devices.

14. The system of claim 9, the processing node further configured to:
schedule the prioritized and de-prioritized wireless devices on different RBs when there are sufficient RBs in a current transmission time interval (TTI) to schedule the prioritized and de-prioritized wireless devices separately.

15. The system of claim 9, the processing node further configured to:
calculate an expected signal-capturing power gain at the first access node after pairing the prioritized wireless devices.

16. The system of claim 9, wherein wireless devices located at a cell-edge of the first access node are de-prioritized for UL MU-MIMO pairing.

17. A method for selecting wireless devices for pairing in a cellular network, the method comprising:
determining, based on a channel condition criteria and a channel orthogonality criteria for one or more wireless devices, that the one or more wireless devices can be served by a first access node for uplink (UL) multi-user multiple-input-multiple-output (MU-MIMO);
prioritizing the one or more wireless devices served by the first access node for ULMU-MIMO pairing;
determining that at least one of the one or more prioritized wireless devices is in a location within a coverage area of a second access node and has underlying coverage deployed by the second access node;
de-prioritizing the at least one prioritized wireless device, based on the location of the at least one prioritized device in the underlying coverage deployed by the second access node, for selection as a UL MU-MIMO wireless device;
pairing remaining prioritized wireless devices to share a same set of resource blocks; and
serving the at least one de-prioritized wireless device by one of (a) handing over the at least one de-prioritized wireless device to the second access node; or (b) distributing remaining resource blocks from the first access node to the at least one de-prioritized wireless device.

18. The method of claim 17, wherein the channel condition criteria is a Signal-to-Interference-Plus-Noise (SINR) ratio reported by the one or more wireless devices above a threshold.

19. The method of claim 17, wherein remaining one or more wireless devices are scheduled on a same resource block (RB) when there are insufficient RBs in a current transmission time interval (TTI) to schedule the prioritized and de-prioritized wireless devices separately.

20. The method of claim 17, wherein the de-prioritized wireless device is located at a cell-edge of the first access node.

* * * * *